(12) United States Patent
Harben

(10) Patent No.: US 9,675,093 B1
(45) Date of Patent: Jun. 13, 2017

(54) PAW SELECTOR SYSTEM AND METHOD

(71) Applicant: Grover S. Harben, Gainesville, GA (US)

(72) Inventor: Grover S. Harben, Gainesville, GA (US)

( * ) Notice: Subject to any disclaimer, the term of this patent is extended or adjusted under 35 U.S.C. 154(b) by 0 days.

(21) Appl. No.: 15/010,112

(22) Filed: Jan. 29, 2016

(51) Int. Cl.
*A22C 18/00* (2006.01)
*A22C 21/00* (2006.01)

(52) U.S. Cl.
CPC .................. *A22C 21/0053* (2013.01)

(58) Field of Classification Search
CPC ............................ A22C 21/066; A22C 21/0023
USPC ........................................................ 452/166
See application file for complete search history.

(56) References Cited

U.S. PATENT DOCUMENTS

| | | | | |
|---|---|---|---|---|
| 4,480,353 A * | 11/1984 | Martin | ............... | A22C 21/0023 452/165 |
| 5,078,644 A * | 1/1992 | DiGerlando | ........... | A22C 21/00 452/166 |
| 5,080,631 A * | 1/1992 | Howard | ............. | A22C 21/0023 452/154 |
| 5,460,567 A * | 10/1995 | Tieleman | ........... | A22C 21/0023 30/353 |
| 2014/0349559 A1* | 11/2014 | Harben, III | ........ | A22C 21/0023 452/166 |
| 2016/0021902 A1* | 1/2016 | Winkelmolen | .... | A22C 21/0007 452/106 |

* cited by examiner

*Primary Examiner* — Richard Price, Jr.

(57) ABSTRACT

A paw selector for maintaining poultry paws in an ordered, indexed manner so that each paw can be matched with the carcass from which it was removed is provided. The paw selector has a tray coupled to a rotatable shaft. Rotation of the shaft causes the walls of the tray to rotate, thereby urging paws on the tray over a stationary tray bottom. Upon reaching a void in the tray bottom, the paws drop through the void onto a lower tray or into a predetermined receptacle for further processing. At least on sensor can maintain correlation between the paw and the carcass from which it was removed for disposal of any rejected paws.

19 Claims, 9 Drawing Sheets

PAW SELECTOR SYSTEM AND METHOD

FIELD OF THE INVENTION

The present invention relates generally to a paw selector system for correlating a poultry paw with the carcass from which it was removed. More specifically, the invention pertains to systems and methods for maintaining poultry paws in an ordered, indexed manner so that each paw can be matched with the carcass from which it was removed.

BACKGROUND OF THE INVENTION

A "paw" refers to the foot of poultry, such as chicken, turkey, quail, duck and the like, once the foot is removed from the bird. In conventional poultry processing plants, the bird is hung on an overhead conveyor and killed. As the bird continues to move along the overhead conveyor (referred to as a picking line), the foot or paw can be cut or otherwise separated from the rest of the carcass. The separated bird is transferred to the eviscerating line, while further down the picking line, the foot or paw is removed from the picking line by a paw cutter or foot unloader. As the bird moves down the eviscerating line its passes before a USDA or plant inspector. If the bird is condemned by the inspector, then the paw or foot must be thrown away. Because the time to reach the inspector is shorter than the time for the foot or paw to reach the foot unloader or paw cutter, a paw holding and correlation system must be used. That is, the foot or paw needs to be tracked or indexed so that the paw is traceable to the bird from which it was cut.

Conventional paw holding and correlation systems include a belt conveyor having a length of around one hundred feet or more and a picking line having a length extended by around six hundred feet or more. A shackle count and shift registers in a computer can be used to identify the foot or paw. These belt systems require a large time gate to remove the condemned paws. This throws away many good paws, undesirably lowering the yield of the plant.

Further, long picking lines can be expensive and difficult to install and maintain. Belt systems can require a large amount of room to install the six hundred feet or more of picking line. These belt systems can have great difficulty in maintaining the correlation between the paw and bird because the line can stretch, the inspector can stop the evisceration line and the like. When the correlation is lost, the uncorrelated paws must be disposed of or held until uncorrelated paws can be correlated.

Accordingly, it remains desirable in the pertinent art to provide a paw selector that maintains paws in an ordered, indexed so that the paw can be traced to a carcass.

SUMMARY

Presented herein is a paw selector for maintaining poultry paws in an ordered, indexed manner so that each paw can be matched with the carcass from which it was removed. The paw selector can comprise at least one tray coupled to a rotatable shaft. Paws cut from a carcass can be positioned on the tray of the paw selector. In use, the tray can rotate and drop the paws onto a lower tray or into a desired receptacle for further processing.

In one aspect, the at least one tray can comprise an inner tray wall and an outer tray wall spaced from the inner tray wall. In another aspect, the at least one tray can further comprise a plurality of tray dividing walls that extend from the inner tray wall to the outer tray wall. Each tray dividing wall can be spaced from an adjacent tray dividing wall to define a plurality of tray pockets between adjacent tray dividing walls, the inner tray wall and the outer tray wall. In one aspect, the tray walls can be formed from a plurality of tray segments. For example, the tray wall can be formed from two, three or more segments that can be coupled together around the shaft to form a completed tray.

The at least one tray can further comprise a tray bottom. In one aspect, the tray bottom can be substantially annular in shape having a tray bottom inner diameter and a tray bottom outer diameter that is greater than the inner diameter. In another aspect, the tray bottom can be substantially flat so that when the tray bottom is positioned adjacent a lower edge of the tray walls, the tray bottom can contact a portion of the tray walls to prevent or restrict material from leaving the tray pocket. The tray bottom can be coupled to the tray walls such that, upon rotation of the tray walls, the tray bottom can remain stationary. In a further aspect, at least one void can be defined in a portion of the tray bottom. In this aspect, the at least one void can be sized and shaped to correspond to the size and shape of at least one of the plurality of tray pockets. Thus, when the contents of a tray pocket are positioned over the at least one void 36 of the tray bottom, the contents of the tray pockets can drop through the void and fall below the tray bottom.

In use, a paw removed from a carcass can be dropped on the paw selector. The walls of the tray can rotate at a speed so that each pocket can have a desired number of paws in it. As the walls of the tray rotates, the walls push or otherwise urge the paw around the fixed annular tray bottom toward the at least one void of the tray bottom. Upon reaching the void, the paw or paws in the tray pocket can drop through the void and land on the adjacent lower tray, where the process repeats itself.

Upon a paw reaching the lowest tray, the paw can be urged toward the at least one void of that tray. If the paw is acceptable, the paw can drop through the void into a first receptacle. If the paw is rejected a processor can actuate an actuator and the tray bottom can rotate to a second position so that the paw will drop through the void and into a second receptacle for disposal.

Related methods of operation are also provided. Other apparatuses, methods, systems, features, and advantages of the paw cutter will be or become apparent to one with skill in the art upon examination of the following figures and detailed description. It is intended that all such additional apparatuses, methods, systems, features, and advantages be included within this description, be within the scope of the paw cutter, and be protected by the accompanying claims.

DESCRIPTION OF THE INVENTION

Figure 1:
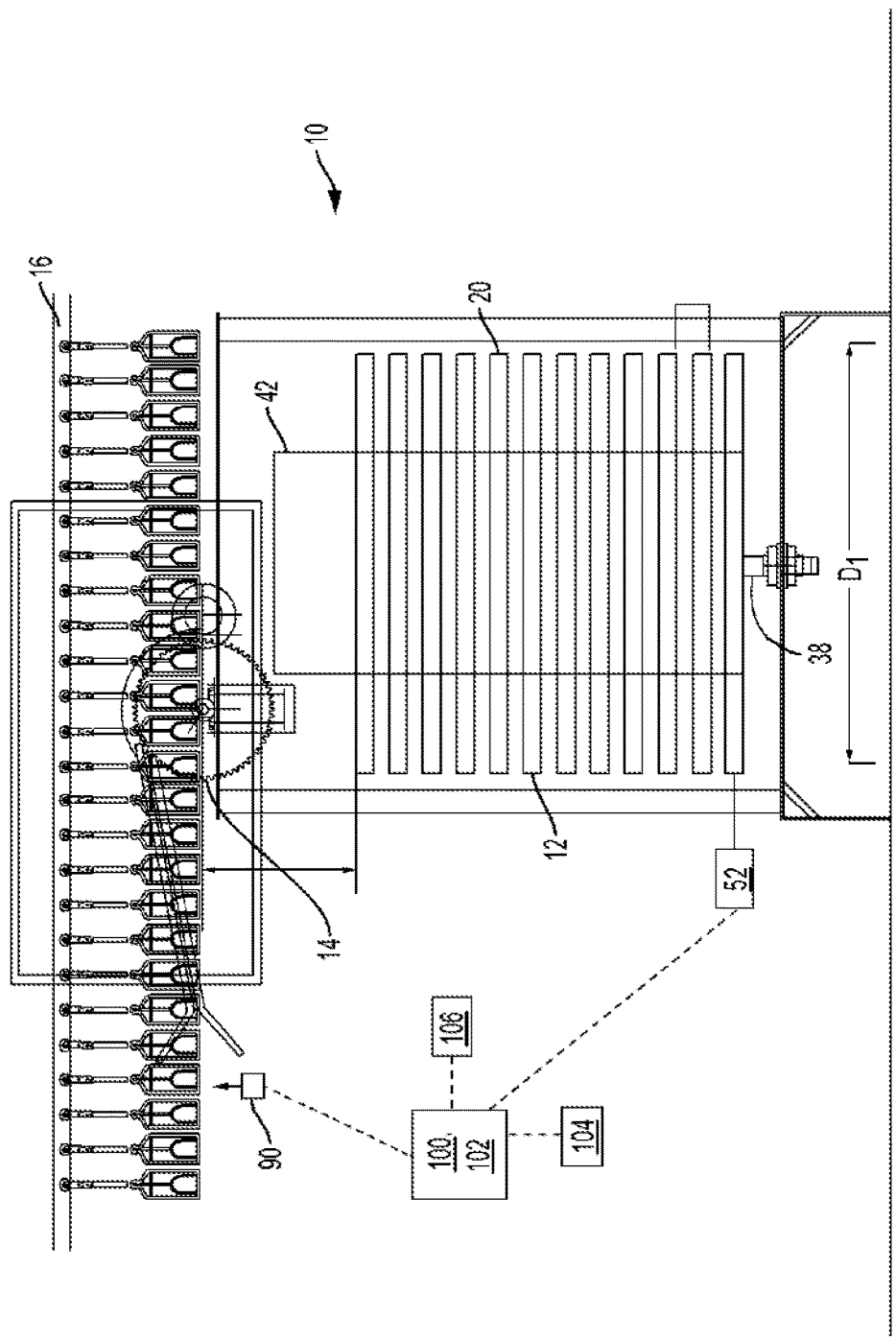
FIG. 1 is a schematic view of the paw selector system of the present application, showing a plurality of trays, according to one aspect.
Figure 2:
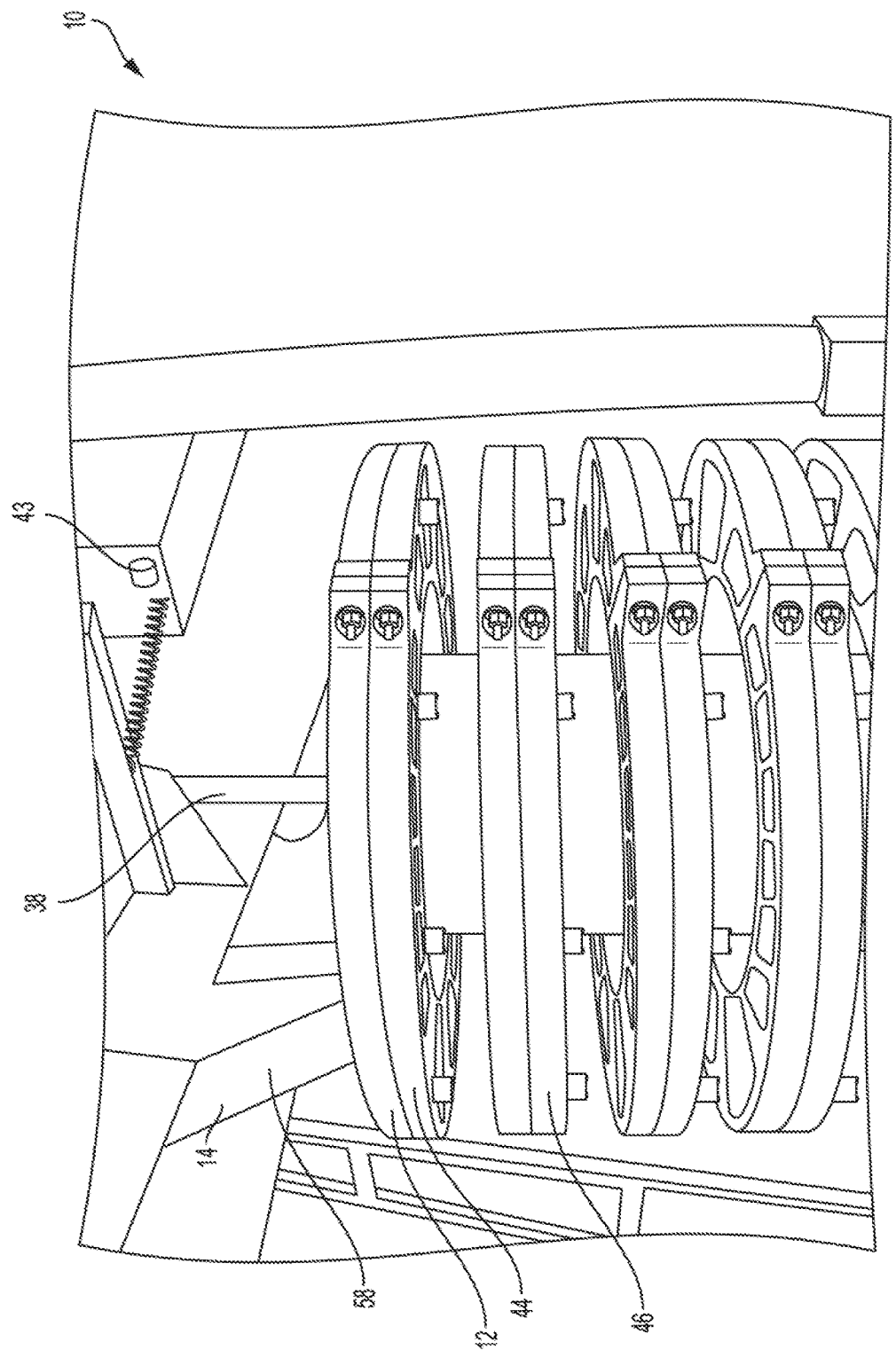
FIG. 2 is a side elevational view of the paw selector system of FIG. 1.
Figure 3:
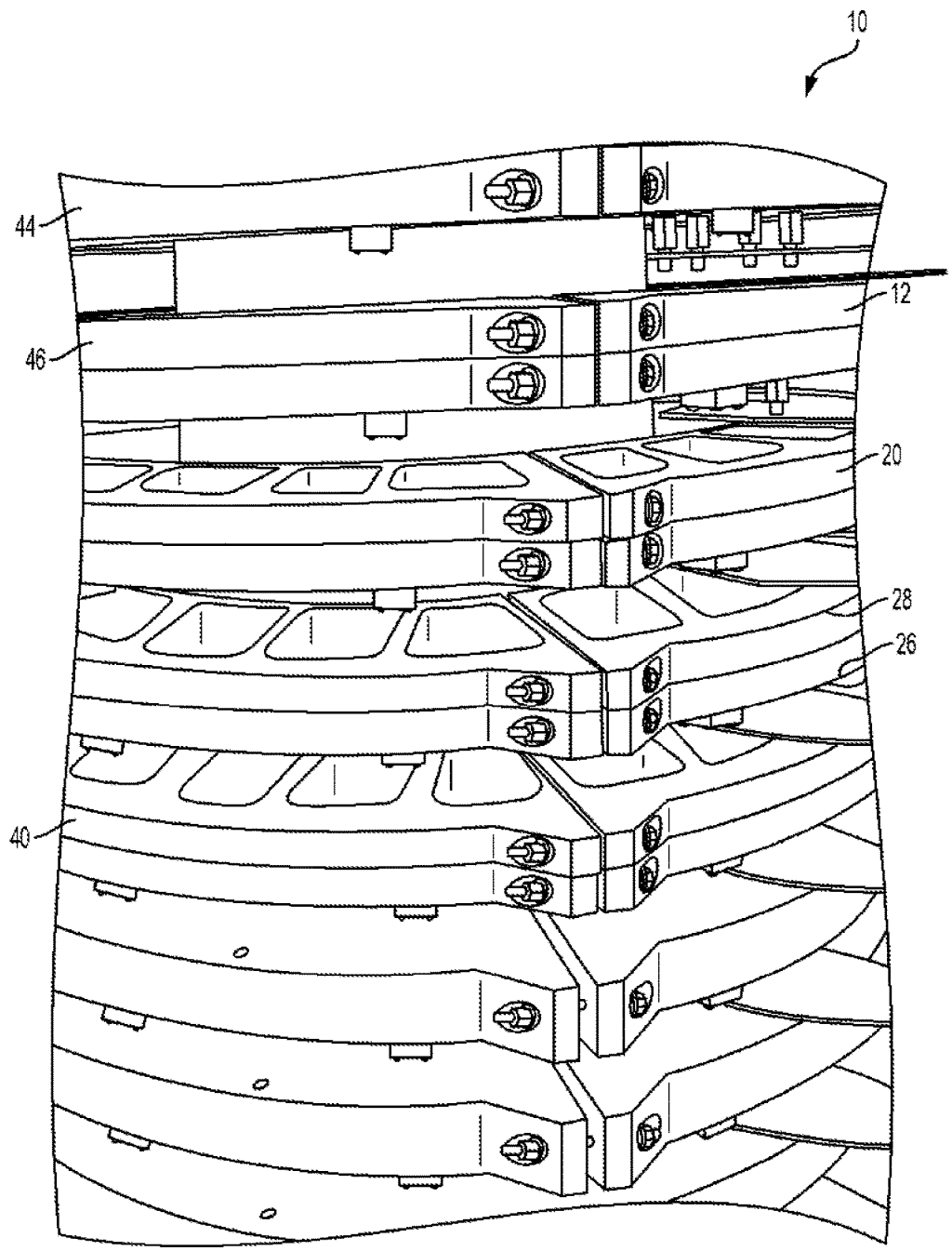
FIG. 3. is a side elevational view of the trays of FIG. 1.
Figure 4:
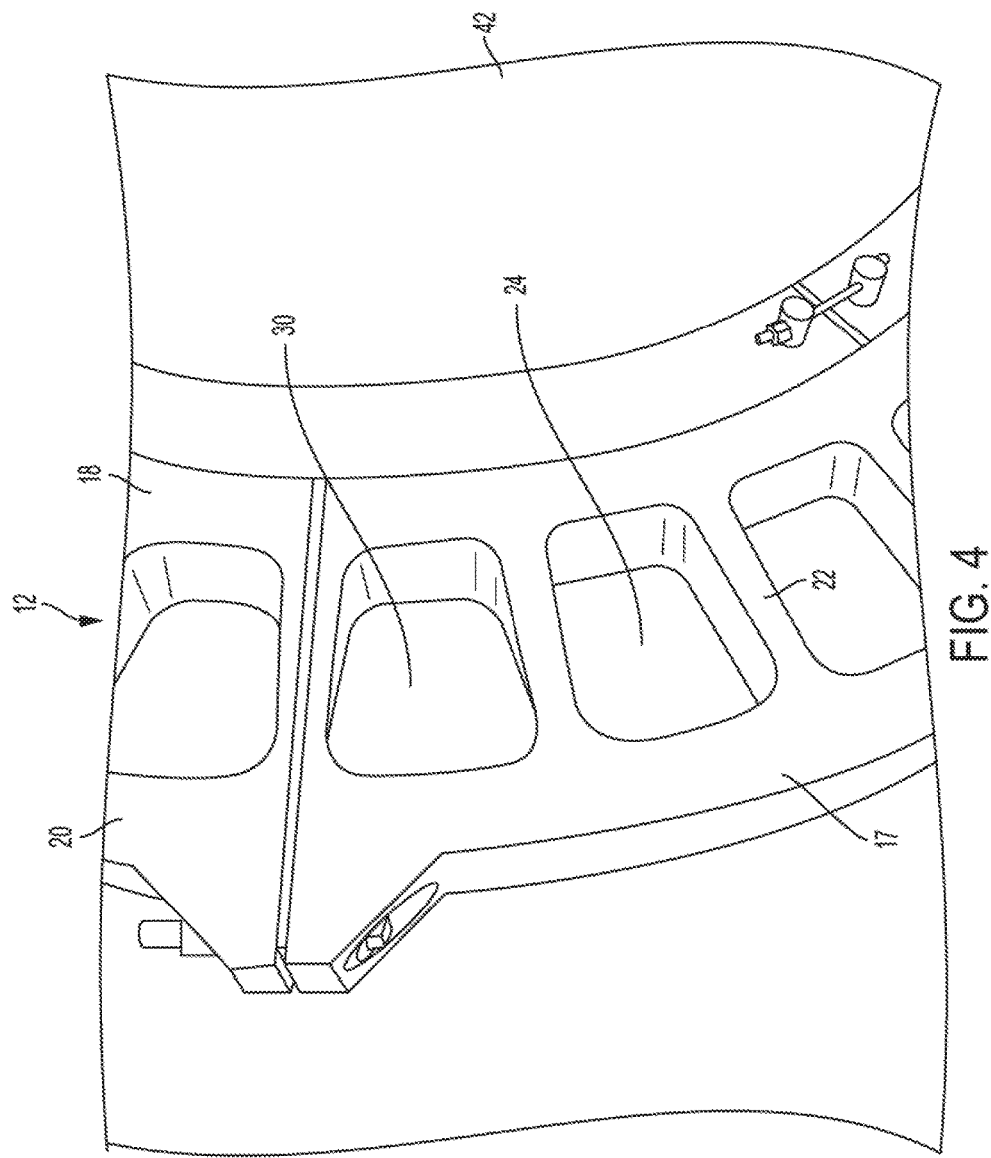
FIG. 4 is a top view of a tray of FIG. 1.
Figure 5:
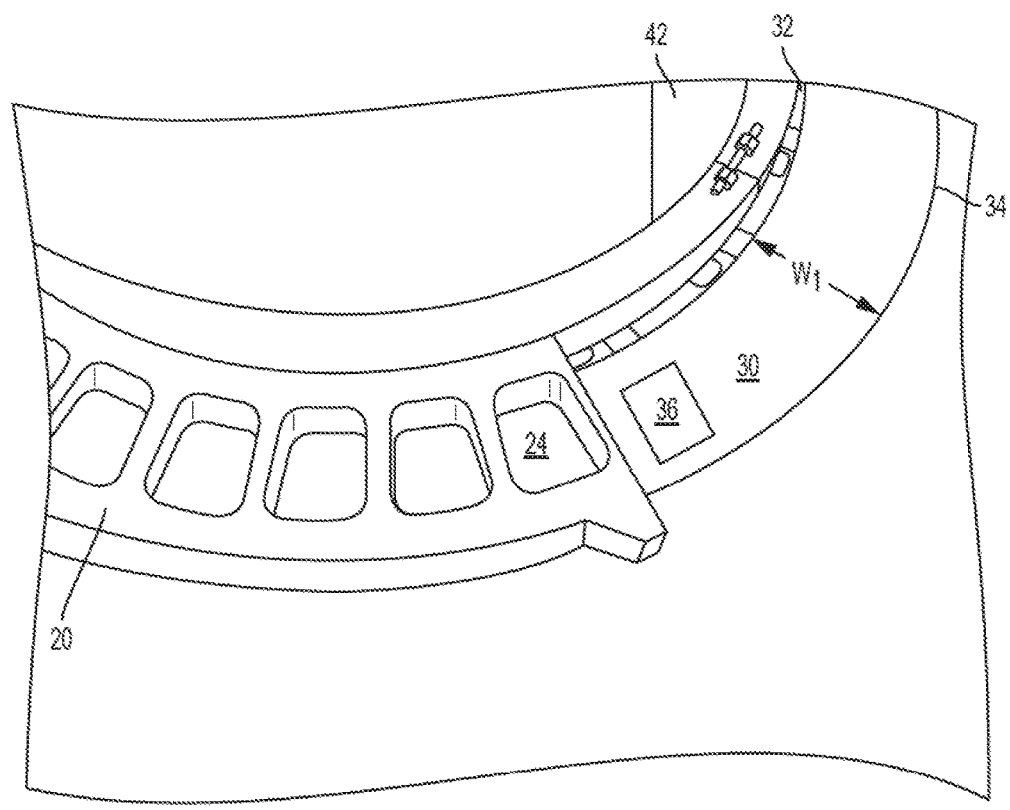
FIG. 5 is a top view of a tray of FIG. 1, in which a tray segment has been removed.
Figure 6:
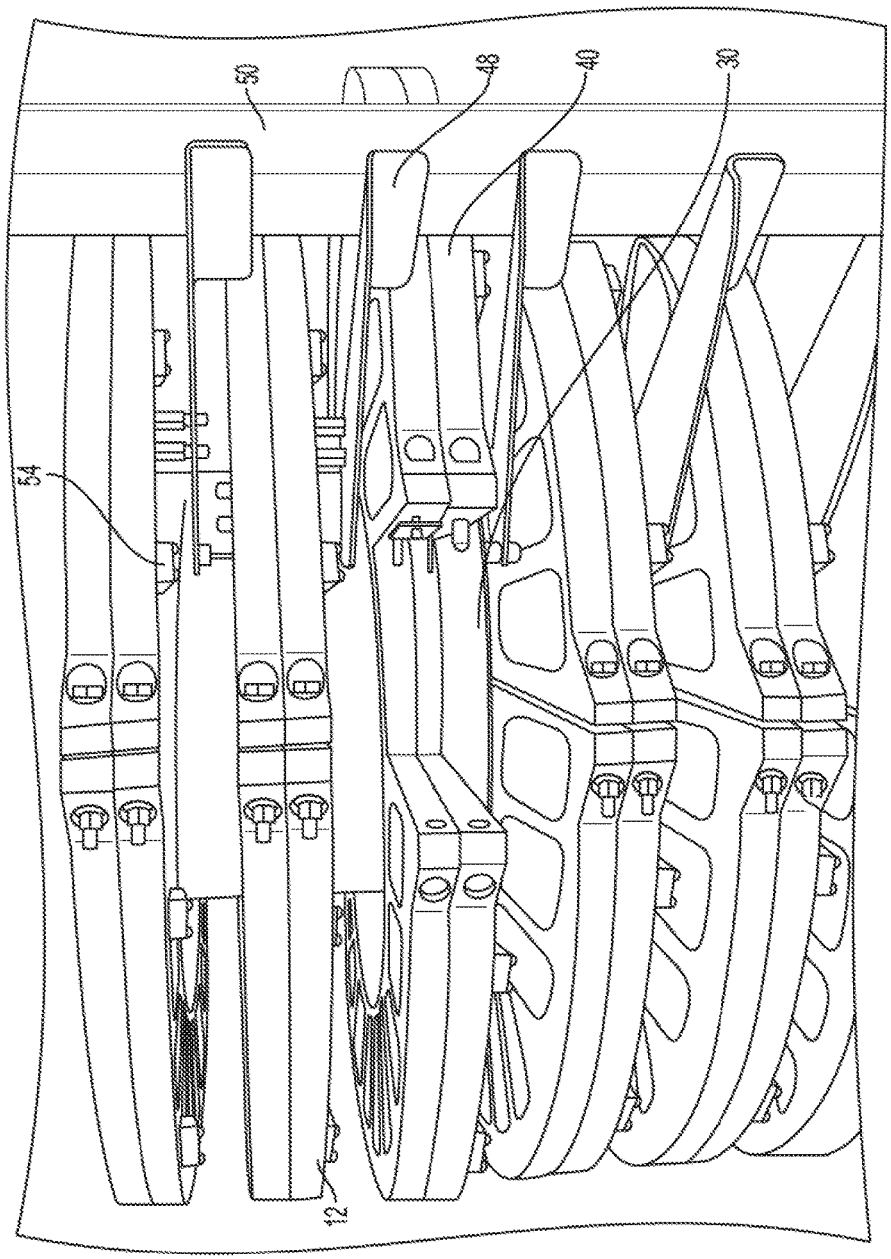
FIG. 6 is a is a side elevational view of the trays of FIG. 1, in which one tray has been separated into a plurality of tray segments.
Figure 7:
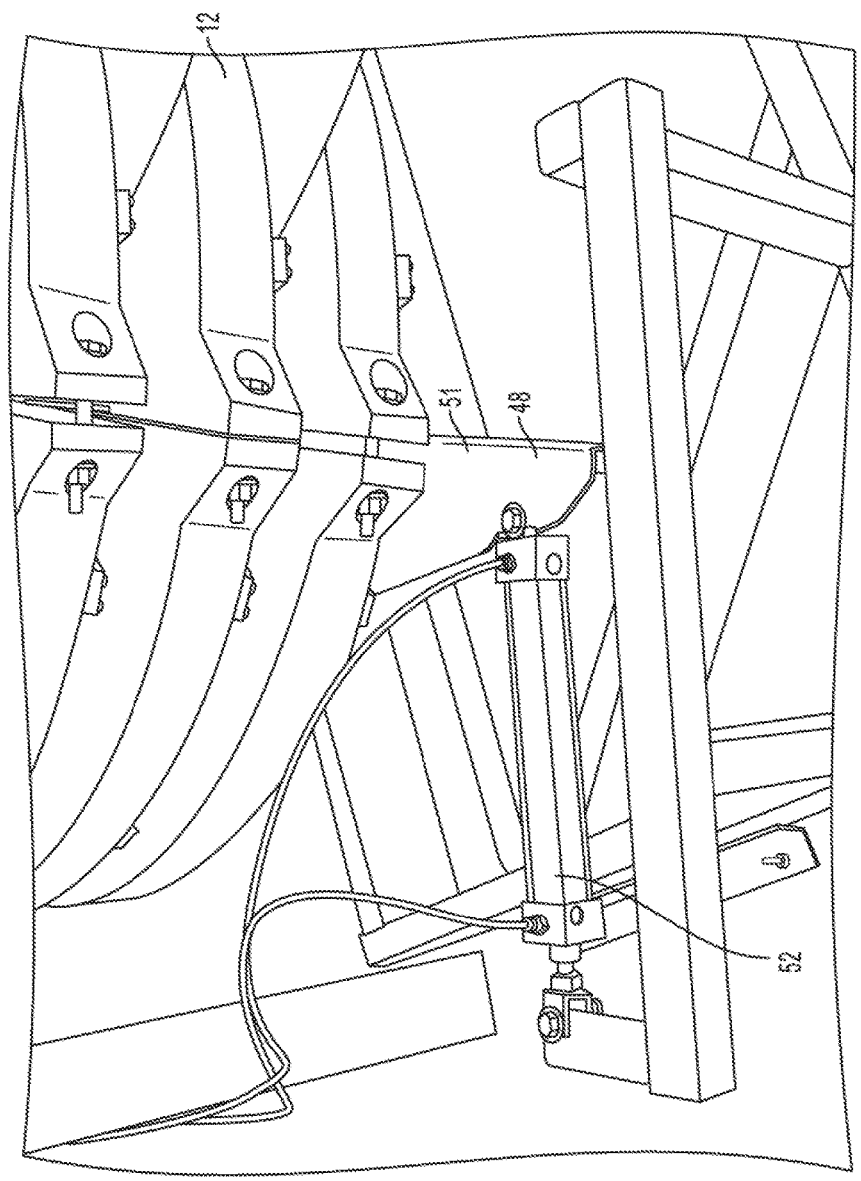
FIG. 7 is a perspective view of an actuator of the paw selector system of FIG. 1.
Figure 8:
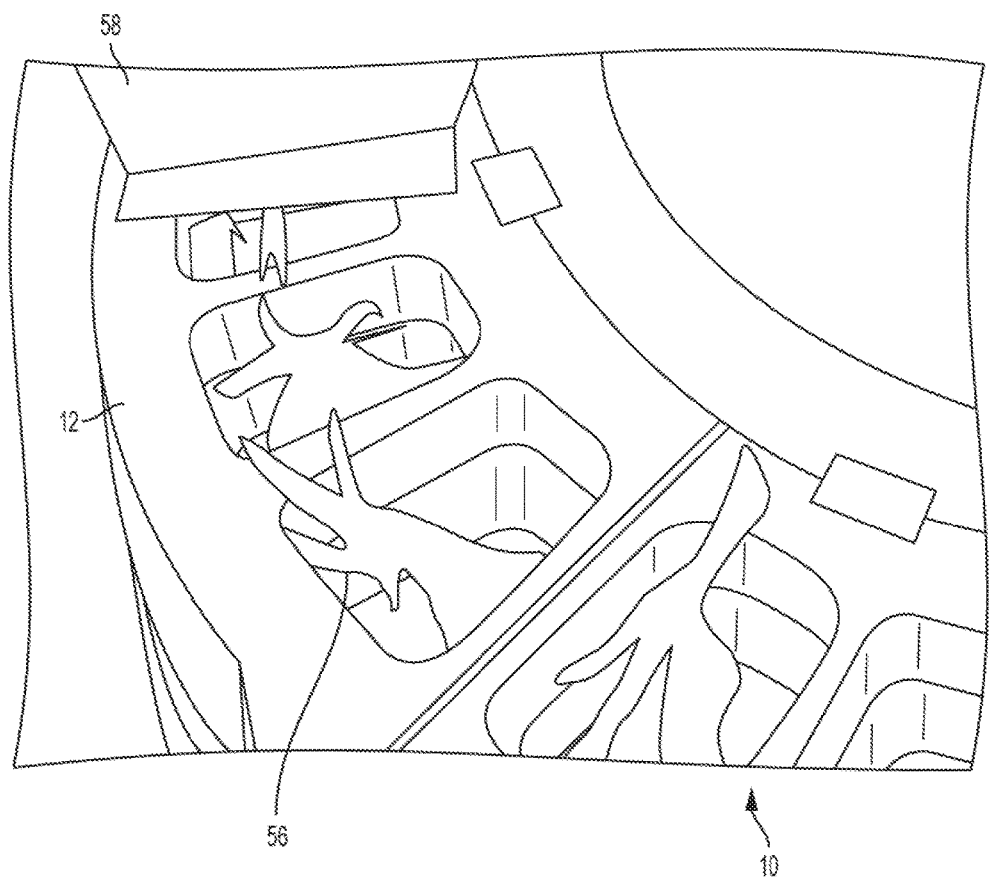
FIG. 8 is a perspective view of the paw selector system of FIG. 1 in use.

The present invention can be understood more readily by reference to the following detailed description, examples, and claims, and their previous and following description. Before the present system, devices, and/or methods are disclosed and described, it is to be understood that this invention is not limited to the specific systems, devices, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. Those skilled in the relevant art will recognize that many changes can be made to the aspects described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "tray" includes aspects having two or more trays unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The application relates to paw selector systems and methods for correlating a poultry paw with the carcass from which it was removed. In one aspect, and as illustrated in FIGS. 1-8, the paw selector 10 can comprise at least one tray 12 coupled to a rotatable shaft 38. At least a portion of the paw selector can be positioned adjacent to a paw cutter system 14 and/or a picking line 16 so that paws cut from a carcass can be positioned on the tray of the paw selector. For example, at least a portion of the paw cutter system and/or the picking line can be positioned above the tray 12 so that cut paws can drop from the paw cutter system 14 and/or the picking line 16 onto the tray. In use, the tray can rotate and drop the paws onto a lower tray or into a desired receptacle for further processing.

The at least one tray 12 can comprise a plurality of tray walls 17. In one aspect, the plurality of tray walls can comprise an inner tray wall 18 and an outer tray wall 20. The inner tray wall can be substantially circular having an outer wall diameter. The outer tray wall can be substantially circular having an inner wall diameter $D_1$ that is greater than the outer wall diameter of the inner tray wall 18. Thus, the outer tray wall 20 can be spaced from the inner tray wall a predetermined distance that can be a pocket length. In another aspect, the at least one tray 12 can further comprise a plurality of tray dividing walls 22 that extend from the inner tray wall 18 to the outer tray wall 20. Each tray dividing wall can be spaced from an adjacent tray dividing wall a predetermined distance that can be a pocket width. In another aspect, the plurality of tray dividing walls 22, the inner tray wall and the outer tray wall can cooperate to define a plurality of tray pockets 24 having a predetermined pocket volume.

In one aspect, the tray walls 17 such as the inner tray wall 18, the outer tray wall 20, and/or the tray dividing walls 22 can be integrally formed as a monolithic unit. Alternatively, at least a portion of the inner tray wall, the outer tray wall, and/or the tray dividing walls can be formed from separate pieces coupled together. For example, at least a portion of the inner tray wall 18, the outer tray wall 20, and/or the tray dividing walls 22 can form a tray segment 40. In this example, a plurality of tray segments can be coupled together with bolts, nuts and the like to form a completed tray. Thus, the walls of the tray 12 can be formed from two, three or more tray segments 40 coupled together.

At least a portion of the inner tray wall 18, the outer tray wall 20, and/or the tray dividing walls 22 can be molded from or cut from a polymeric material, such as nylon and the like. Optionally, at least a portion of the inner tray wall, the outer tray wall, and/or the tray dividing walls can be formed from a metallic material, such as stainless steel and the like, that has been cut and/or welded together to define the tray pockets. In another aspect, the inner tray wall 18, the outer tray wall 20, and the tray dividing walls 22 can each have a wall height substantially the same. That is, the distance from a lower edge 26 of each tray wall 17 to an upper edge 28 can be substantially the same.

The at least one tray 12 can further comprise a tray bottom 30. In one aspect, the tray bottom can be substantially annular in shape having a tray bottom width $W_1$. For example, the tray bottom width can be the difference between a tray bottom inner diameter 32 and a tray bottom outer diameter 34. In another aspect, the tray bottom width can be greater than the pocket length of the tray pockets 24. In a further aspect, the tray bottom can be substantially flat so that when the tray bottom 30 is positioned adjacent the lower edge 26 of the tray walls 17, the tray bottom can contact a portion of the tray walls to prevent or restrict material from leaving the tray pocket 24.

In one aspect, at least one void 36 can be defined in a portion of the tray bottom 30. In this aspect, the at least one void can be sized and shaped to correspond to the size and shape of at least one of the plurality of tray pockets. Thus, when the contents of a tray pocket are positioned over the at least one void 36 of the tray bottom, the contents of the tray pockets can drop through the void and fall below the tray bottom.

At least one wing 48 can extend radially from a portion of the tray bottom 30. In one aspect, the wing can be configured to contact or couple to a fixed post 50 to prevent rotation of the tray bottom. In another aspect, the wing of at least a lowest tray bottom 51 can be coupled to an actuator 52 that can selectively rotate the lowest tray bottom to a desired orientation. For example, the lowest tray bottom can be rotated to a first position, in which the at least one void is at a first orientation relative to the center of the lowest tray bottom, and a second position, in which the at least one void is at a second orientation relative to the center of the lowest tray bottom that is different than the first orientation.

The paw selector 10 can further comprise a rotatable shaft 38. In one aspect, the shaft can be positioned substantially vertically. In another aspect, a substantially cylindrical drum 42 can be coupled to the shaft so that rotation of the shaft causes the drum to rotate at the same rotation speed. As can be appreciated, conventional gears, motors 43, cams, and the like can be utilized to urge movement of the rotatable shaft as desired. In one aspect, the shaft can be coupled to the picking line so that the picking line drives the shaft. In another aspect, the rotation speed can be an adjustable rotation speed.

In one aspect, the at least one tray 12 comprises a plurality of stacked trays. For example, a first tray 44 of the plurality of stacked trays can overlie at least a portion of a second tray 46. As can be appreciated, there can be any number of stacked trays, such as for example, 2, 3, 4, 5, 6, 7, 8, 9, 10, 11, 12, 13, 14, 15, 16, 17, 18, 19, 20 or more than 20 stacked trays.

To assemble the paw selector 10 of the present application, a portion of the tray walls 17 of a first tray can be coupled to the rotatable shaft 38. In one aspect, a portion of the inner tray wall 18 can be attached to the cylindrical drum 42. For example, if the tray is formed from a plurality of tray segments 40, the tray segments can be positioned around the drum and coupled together with bolts, nuts and the like. As can be appreciated, the tray segments can be securely tightened to each other so that the tray segments 40 are compression-fit to the drum or shaft. Further, bolts, clips and the like can be used to secure the tray walls 17 and/or any tray segments to the drum or shaft. Thus, rotation of the shaft 38 can cause the walls of the tray to rotate as well.

The tray bottom 30 can be fixedly coupled to the lower edge 26 of the tray 12. That is, the tray bottom can be positioned substantially in contact with the lower edge of the walls of the tray so that the tray bottom encloses the bottom of each tray pocket 24. However, the tray bottom can be fixedly attached in position so that rotation of the rotatable shaft 38 does not cause rotation of the tray bottom 30. For example, the wing 48 of each tray can be fixedly attached to a stationary object, such as a fixed post 50 to prevent rotation of the tray bottom. In one aspect, a plurality of clips 54 can extend from the lower edge 26 of the tray walls. The clips can allow the tray walls 17 to rotate relative to the tray bottom 30 while keeping the tray bottom in a desired position relative to the lower edge.

The tray bottom 30 can be oriented so that in the first position, the void is aligned with a first receptacle or conveyor, and in the second position, the void is aligned with a second receptacle or conveyor. In use, described more fully below, accepted paws can drop into the first receptacle or conveyor and upon detecting, counting or sensing a rejected paw, the actuator 52 can rotate the tray bottom so that the void is in the second position and the rejected paws can drop through the void to the second receptacle or conveyor.

If the paw selector 10 comprises a plurality of stacked trays 12, a second tray can be positioned over the first tray a spaced distance. That is, the second tray can be substantially aligned and in an overlying position relative to the first tray. Assembly of the second and all subsequent trays can be substantially the same as that of the first tray. However, the void 36 defined in each tray 12 can be at a different orientation relative to the shaft 38 than the adjacent trays. Thus, the voids of adjacent trays should not be vertically aligned so that anything dropping through a void 36 in a tray does not also drop through the void defined in the tray below.

In one aspect, the paw selector further comprises at least one sensor 90 and a control system 100. In this aspect, the at least one sensor can be electrically coupled to the control system. In one aspect, the sensor can be a proximity sensor configured to sense the absence or presence of an object, according to one aspect. In another aspect, the sensor can be a photoelectric sensor configured to sense the absence or presence of an object by using a light transmitter and a photoelectric receiver. In a further aspect, the sensor can be an encoder coupled to the shaft 38 or to the motor 43 and configured to sense the rotational speed of the shaft or motor.

In one aspect, the control system 100 can comprise a processor 102 electrically coupled to the at least one sensor 90 and programmed to selectively monitor, display, set and/or control at least one of the operating parameters of the paw selector. In another aspect, the processor can be electrically coupled to at least one of the eviscerating line, the picking line 16, the motor 43 and the actuator 52. Thus, in one aspect, the processor can be configured to actuate the actuator 52 when appropriate so that rejected paws can be removed from the system. In another aspect, the processor can be configured to monitor, display, set and/or control the speed at which paw selector rotates.

For example, the rotational speed of the paw selector 10 can be adjusted automatically by the processor based on a speed of the picking line 16 and/or the eviscerating line. In another example, in one aspect, a counter or other sensor 90 sensing the speed and/or presence of paws on the picking line and/or the eviscerating line can send this information to the processor 102. The at least one motor 43 can be configured to selectively speed up or slow down the shaft as necessary to provide for a desired rate of paws to be processed. That is, the processor can control the speed with which the shaft, and thus each tray 12 rotates. Further, the at least one sensor 90 on the eviscerating line and on the picking line, and the sensor of the paw selector can all provide counts to the processor. As these picking line 16 and/or the paw selector counts reach the eviscerating count corresponding to the desired inspector location or locations, the processor can update the remaining counts to the rejection point at the end of the paw selector.

In one aspect, the paw selector 10 can further comprise a timer 106. In this aspect, the timer can be electrically coupled to at least one sensor 90 of the plurality of sensors and/or the processor 102. The timer can be configured to measure the amount of time passed upon receiving a signal from the at least one sensor and/or the processor.

In one aspect, the processor 102 of the control system 100 can comprise, for example and without limitation, a computer or a Programmable Logic Controller (PLC), that is in communication with a display device 104. In another aspect, the processor can be configured as part of a feedback control loop to selectively control the speed of the paws within a predetermined tolerance based on the speed sensed by the at least one sensor 90.

Figure 9:
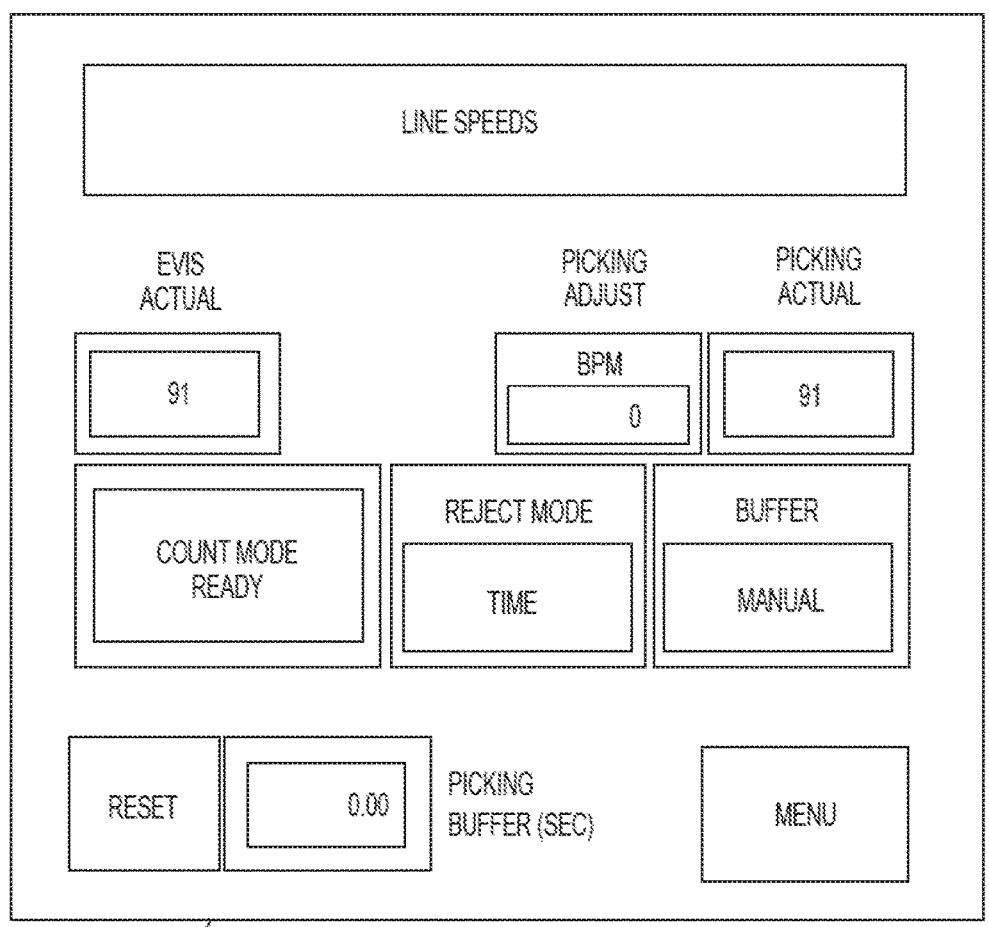
FIG. 9 is a view of a display device of the paw selector system of FIG. 1, according to one aspect.

With reference to FIG. 9, in one aspect, the control system 100 can further comprise the display device 104 configured to display at least one of: the speed at which the picking line is operating and the rejection mode in which the control system is operating. For example, the control system can reject paws in "Time" mode. In Time mode, the time within which a paw has been in the paw selector 10 can be monitored and paws can be rejected by correlating the time to a rejected carcass. In another example, in "Count" mode, the number of paws in the paw selector 10 are counted and known. In Count mode, the processor 102 can correlate when the rejected paw reaches the rejection point (wherein the lowest tray bottom is in the second position) and the rejected carcass on the eviscerating line by counting the paws.

If there is an error with a sensor 90, the processor 102 can recognize the error and notify the operator of the sensor problem. In one aspect, the processor can automatically switch from "Count" mode to "Time" mode so there is no loss of product. In another aspect, while in "Time" mode, a gate time can be varied to cover line stoppage. This can be a number proportional to the amount of time the line is stopped.

In use, a paw 56 removed from a carcass by, for example and without limitation, a paw cutter system 14, can be dropped on the paw selector 10. For example, the paw can slide down a chute 58 sized and shaped to align the paw with the tray pockets 24 of the tray 12. As discussed above, the walls 17 of the tray can rotate while the tray bottom 30 can remain stationary. Thus, the walls of the tray can rotate at a speed so that each pocket can have a desired number of paws in it. As the walls 17 of the tray rotates, the walls push or otherwise urge the paw 56 around the annular tray bottom toward the at least one void 36 of the tray bottom 30. Upon reaching the void, the paw or paws in the tray pocket 24 can drop through the void and land on the adjacent lower tray. In this adjacent lower tray 12, the tray walls 17 can push or otherwise urge the paw toward the at least one void 36, wherein the paw drops through to the next lower tray. This can continue until the lowest tray is reached by the paw.

Upon reaching the lowest tray, the paw 56 can be urged toward the at least one void 36 of that tray. If the paw is acceptable, the tray bottom 30 will remain in the first position and the paw will drop through the void onto the first receptacle. If the paw is rejected, (that is, if the carcass from which the paw came has been rejected), the processor 102 can actuate the actuator 52 and the tray bottom can rotate to the second position so that the paw 56 will drop through the void and onto the second receptacle. For example, if the carcass from which the paw came has been rejected, the control system 100 can use a count of paws and carcasses to correlate the rejected paw with the rejected carcass and actuate the actuator when the rejected paw reaches the rejection point. In another example, if the carcass from which the paw came has been rejected, the control system 100 can use a timer to correlate the rejected paw with the rejected carcass.

As can be appreciated, the paw selector 10 has a small foot print. In one aspect, the capacity of the paw selector can be increased by simply an additional tray 12 on top of existing trays. In another aspect, while running in "Count" mode, line stretch in any of the picking and/or eviscerating lines can be irrelevant because the number of paws and carcasses is monitored and tracked. The paw selector 10 can easily be combined with a paw cutter system 14 or paw unloaded to put an exact number of paws or feet in a tray in exact time. Hence, there can be outstanding correlation between a rejected carcass and the paw corresponding thereto. In a further aspect, the plurality of sensors 90 coupled to the processor 102 can eliminate any issues with line speed variations or line stoppage of the eviscerating line. Further each sensor can be independent hence every line stoppage or speed variation can be sensed.

In one aspect, the "floating" tray bottom 30 (relative to the tray walls) can allow for variations in material and manufacturing tolerances. In another aspect, this design allow for quick and easy removal of the tray wall for clean up and sanitation. Thus, the tray segments 40 can be removed while the floating tray bottom 30 can stay in place coupled to the shaft 38 or drum 42.

Although several aspects of the invention have been disclosed in the foregoing specification, it is understood by those skilled in the art that many modifications and other aspects of the invention will come to mind to which the invention pertains, having the benefit of the teaching presented in the foregoing description and associated drawings. It is thus understood that the invention is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and not for the purposes of limiting the described invention.

What is claimed is:

1. A paw selector system for maintaining poultry paws in an ordered manner comprising:
   a rotatable shaft;
   at least one tray comprising:
      an inner tray wall, an outer tray wall spaced from the inner tray wall and a plurality of tray dividing walls that extend from the inner tray wall to the outer tray wall, wherein each tray dividing wall of the plurality of tray dividing walls is spaced from an adjacent tray dividing wall to define a plurality of tray pockets between adjacent tray dividing walls, the inner tray wall and the outer tray wall, wherein the at least one tray is coupled to the rotatable shaft so that the at least one tray is rotatable with the rotatable shaft; and
      a tray bottom positioned adjacent a lower edge of the tray walls of the at least one tray, wherein at least one void is defined in a portion of the tray bottom, wherein the at least one void is sized to correspond to the size of at least one of the plurality of tray pockets, and wherein the tray bottom is coupled to the tray walls such that, upon rotation of the tray walls, the tray bottom remains stationary,
   wherein the poultry paw is positionable in a tray pocket, wherein rotation of the rotatable shaft causes the tray pocket and the poultry paw positioned therein to rotate relative to the tray bottom, and wherein when the poultry paw is rotated over the at least one void of the tray bottom, the poultry paw drops through the at least one void.

2. The paw selector system of claim 1, wherein the at least one tray comprises a plurality of trays that are stacked.

3. The paw selector system of claim 2, wherein a first tray of the plurality of stacked trays overlies at least a portion of a second tray of the plurality of stacked trays.

4. The paw selector system of claim 3, wherein upon rotation of the poultry paw to the at least one void of the first tray, the poultry paw drops through the at least one void into a tray pocket of the second tray.

5. The paw selector system of claim 4, wherein the plurality of stacked trays comprises a lowest tray underlying each of the other stacked trays.

6. The paw selector system of claim 5, wherein a portion of the tray bottom of the lowest tray is coupled to an actuator configured to selectively rotate the lowest tray bottom between a first position, in which the at least one void of the tray bottom of the lowest tray is at a first orientation relative to the center of the lowest tray bottom, and a second position, in which the at least one void is at a second orientation relative to the center of the lowest tray bottom that is different than the first orientation.

7. The paw selector system of claim 6, wherein in the first position, the at least one void overlies a first conveyor, and in the second position, the at least one void overlies a second conveyor.

8. The paw selector system of claim 7, further comprising a processor and at least one sensor electrically coupled to the processor.

9. The paw selector system of claim 8, wherein at least one sensor senses the presence of a poultry paw, and wherein at least one sensor senses the rotational speed of the rotatable shaft.

10. The paw selector system of claim 9, wherein the processor is configured to count the number of poultry paws sensed by the at least one sensor, and wherein the processor correlates when a predetermined poultry paw reaches the lowest tray by comparing the number of poultry paws, tray pockets and rotational speed of the rotatable shaft.

11. The paw selector system of claim 10, wherein when a predetermined poultry paw reaches the lowest tray, the processor actuates the actuator to the first position if the poultry paw is acceptable, and to the second position if the poultry paw is rejected.

12. The paw selector system of claim 9, wherein the processor monitors the time within which a poultry paw has been positioned in the paw selector system.

13. The paw selector system of claim 12, wherein when a predetermined poultry paw has been in the paw selector system a predetermined amount of time, the processor actuates the actuator to the first position if the poultry paw is acceptable, and to the second position if the poultry paw is rejected.

14. The paw selector system of claim 12, wherein the poultry paw is automatically supplied to the paw selector system by a paw cutter system.

15. A method of maintaining poultry paws in an ordered manner comprising:
    providing a paw selector system comprising:
        a rotatable shaft;
        at least one tray comprising:
            an inner tray wall, an outer tray wall spaced from the inner tray wall and a plurality of tray dividing walls that extend from the inner tray wall to the outer tray wall, wherein each tray dividing wall of the plurality of tray dividing walls is spaced from an adjacent tray dividing wall to define a plurality of tray pockets between adjacent tray dividing walls, the inner tray wall and the outer tray wall, wherein the at least one tray is coupled to the rotatable shaft so that the at least one tray is rotatable with the rotatable shaft; and
            a tray bottom positioned adjacent a lower edge of the tray walls of the at least one tray, wherein at least one void is defined in a portion of the tray bottom, wherein the at least one void is sized and shaped to correspond to the size and shape of at least one of the plurality of tray pockets, and wherein the tray bottom is coupled to the tray walls such that, upon rotation of the tray walls, the tray bottom remains stationary; and
    positioning a poultry paw in a tray pocket, wherein rotation of the rotatable shaft causes the tray pocket and the poultry paw positioned therein to rotate relative to the tray bottom, and wherein when the poultry paw is rotated over the at least one void of the tray bottom, the poultry paw drops through the at least one void.

16. The method of claim 15, wherein the paw selector system further comprises a processor and at least one sensor electrically coupled to the processor.

17. The method of claim 16, wherein at least one sensor senses the presence of a poultry paw, and wherein at least one sensor senses the rotational speed of the rotatable shaft.

18. The method of claim 17, wherein the processor is configured to count the number of poultry paws sensed by the at least one sensor, and wherein the processor correlates when a predetermined poultry paw reaches the lowest tray by comparing the number of poultry paws, tray pockets and rotational speed of the rotatable shaft.

19. A method of correlating a poultry paw with the carcass from which it was removed, the method comprising:
    providing a paw selector system comprising:
        a rotatable shaft;
        at least one tray comprising:
            an inner tray wall, an outer tray wall spaced from the inner tray wall and a plurality of tray dividing walls that extend from the inner tray wall to the outer tray wall, wherein each tray dividing wall of the plurality of tray dividing walls is spaced from an adjacent tray dividing wall to define a plurality of tray pockets between adjacent tray dividing walls, the inner tray wall and the outer tray wall, wherein the at least one tray is coupled to the rotatable shaft so that the at least one tray is rotatable with the rotatable shaft;
        a tray bottom positioned adjacent a lower edge of the tray walls of the at least one tray, wherein at least one void is defined in a portion of the tray bottom, wherein the at least one void is sized and shaped to correspond to the size and shape of at least one of the plurality of tray pockets, and wherein the tray bottom is coupled to the tray walls such that, upon rotation of the tray walls, the tray bottom remains stationary; and
        a processor and at least one sensor electrically coupled to the processor, wherein at least one sensor senses the presence of a poultry paw, and wherein at least one sensor senses the rotational speed of the rotatable shaft,
    positioning a poultry paw in a tray pocket, wherein rotation of the rotatable shaft causes the tray pocket and the poultry paw positioned therein to rotate relative to the tray bottom, wherein when the poultry paw is rotated over the at least one void of the tray bottom, the poultry paw drops through the at least one void, wherein the processor is configured to count the number of poultry paws sensed by the at least one sensor, and wherein the processor correlates when a predetermined poultry paw reaches the lowest tray by comparing the number of poultry paws, tray pockets and rotational speed of the rotatable shaft.

\* \* \* \* \*